United States Patent [19]

Ho et al.

[11] Patent Number: 4,792,541

[45] Date of Patent: * Dec. 20, 1988

[54] HYDROTREATING CATALYSTS COMPRISING SUPPORTED, MIXED METAL SULFIDE OF IRON PROMOTED MO AND W AND THEIR USES

[75] Inventors: Teh C. Ho, Bridgewater; Archie R. Young, Montclair; Allan J. Jacobson, Princeton; Russell R. Chianelli, Somerville, all of N.J.

[73] Assignee: Exxon Research and Engineering Company, Florham Park, N.J.

[*] Notice: The portion of the term of this patent subsequent to Feb. 14, 2001 has been disclaimed.

[21] Appl. No.: 898,647

[22] Filed: Aug. 21, 1986

Related U.S. Application Data

[62] Division of Ser. No. 687,538, Dec. 28, 1984, Pat. No. 4,632,747.

[51] Int. Cl.$^4$ .............................................. B01J 31/22
[52] U.S. Cl. ................................... 502/167; 502/165; 502/219; 502/220; 502/221
[58] Field of Search ............... 502/165, 167, 220, 221, 502/219

[56] References Cited

U.S. PATENT DOCUMENTS

| | | | |
|---|---|---|---|
| 4,431,747 | 2/1984 | Seiver et al. | 502/220 |
| 4,595,672 | 6/1986 | Ho et al. | 502/220 X |
| 4,666,878 | 5/1987 | Jacobson et al. | 502/220 X |

OTHER PUBLICATIONS

Rideal, *Concepts in Catalysis*, Pub. by Academic Press, N.Y., N.Y. (1968), pp. 4 & 5.

*Primary Examiner*—Patrick P. Garvin
*Attorney, Agent, or Firm*—Edward M. Corcoran; Joseph J. Dvorak

[57] ABSTRACT

This invention relates to the preparation and use of catalysts useful for hydroprocessing processes, such as hydrotreating, wherein said catalysts are formed by heating, at elevated temperature, in the presence of sulfur and under oxygen-free conditions, a composite of support material and one or more catalyst precursor salts containing a thiometallate anion of Mo, W or mixture thereof and a cation comprising one or more divalent promoter metals at least one of which is iron, wherein said promoter metal or metals are chelated by at least one neutral, nitrogen-containing polydentate ligand, and wherein said additional divalent promoter metal, if any, is selected from the group consisting of Ni, Co, Mn, Zn, Cu and mixture thereof.

18 Claims, No Drawings

HYDROTREATING CATALYSTS COMPRISING SUPPORTED, MIXED METAL SULFIDE OF IRON PROMOTED MO AND W AND THEIR USES

This is a division of application Ser. No. 687,538 filed Dec. 28, 1984 and now U.S. Pat. No. 4,632,747.

BACKGROUND OF THE INVENTION

1. Field of the Invention

This invention relates to a process for preparing supported, iron sulfide promoted molybdenum and tungsten sulfide catalysts, the supported catalyst species prepared by such process, and to the use of such supported species for hydroprocessing processes, particularly hydrotreating. More particularly, this invention relates to the preparation and use of catalysts useful for hydroprocessing processes, such as hydrotreating, wherein said catalysts are formed by heating, at elevated temperature, in the presence of sulfur and under oxygen-free conditions, a composite of support material and one or more catalyst precursor salts containing a thiometallate anion of Mo, W or mixture thereof and a cation comprising one or more divalent promoter metals at least one of which is iron, wherein said promoter metal or metals are chelated by at least one neutral, nitrogen-containing polydentate ligand, and wherein said additional divalent promoter metal, if any, is selected from the group consisting of Ni, Co, Mn, Zn, Cu and mixture thereof.

BACKGROUND OF THE DISCLOSURE

The pretroleum industry is increasingly turning to coal, tar sands, heavy crudes and resids as sources for future feedstocks. Feedstocks derived from these heavy materials contain more sulfur and nitrogen than feedstocks derived from more conventional crude oils. Such feedstocks are commonly referred to as being dirty feeds. These feeds therefore require a considerable amount of upgrading in order to obtain usable products therefrom, such upgrading or refining generally being accomplished by hydrotreating processes which are wellknown in the petroleum industry.

These processes require the treating with hydrogen of various hydrocarbon fractions, or whole heavy feeds, or feedstocks, in the presence of hydrotreating catalysts to effect conversion of at least a portion of the feeds, or feedstocks to lower molecular weight hydrocarbons, or to effect the removal of unwanted components, or compounds, of their conversion to innocuous or less undesirable compounds. Hydrotreating may be applied to a variety of feedstocks, e.g., solvents, light, middle, or heavy distillate feeds and residual feeds, or fuels. In hydrotreating relatively light feeds, the feeds are treated with hydrogen, often to improve odor, color, stability, combustion characteristics, and the like. Unsaturated hydrocarbons are hydrogenated, and saturated. Sulfur and nitrogen are removed in such treatments. In the treatment of catalytic cracking feedstocks, the cracking quality of the feedstock is improved by the hydrotreating. Carbon yield is reduced, and gasoline yield is generally increased. In the hydrodesulfurization of heavier feedstocks, or residua, the sulfur compounds are hydrotreating and cracked. Carbon-sulfur bonds are broken, and the sulfur for the most part is converted to hydrogen sulfide which is removed as a gas from the process. Hydrodenitrogenation, to some degree also generally accompanies hydrodesulfurization reactions. In the hydrodenitrogenation of heavier feedstocks, or residua, the nitrogen compounds are hydrogenated and cracked. Carbon-nitrogen bonds are broken, and the nitrogen is converted to ammonia and evolved from the process. Hydrodesulfurization, to some degree also generally accompanies hydrodenitrogenation reactions. In the hydrodesulfurization of relatively heavy feedstocks, emphasis is on the removal of sulfur from the feedstock. In the hydrodenitrogenation of relatively heavy feedstocks emphasis is on the removal of nitrogen from the feedstock. Albeit, although hydrodesulfurization and hydrodenitrogenation reactions generally occur together, it is usually far more difficult to achieve effective hydrodenitrogenation of feedstocks than hydrodesulfurization of feedstocks.

Catalysts most commonly used for these hydrotreating reactions include materials such as cobalt molybdate on alumina, nickel on alumina, cobalt molybdate promoted with nickel, nickel tungstate, etc. Also, it is well-known to those skilled in the art to use certain transition metal sulfides such as cobalt and molybdenum sulfides and mixtures thereof to upgrade oils containing sulfur and nitrogen compounds by catalytically removing such compounds in the presence of hydrogen, which processes are collectively known as hydrotreating or hydrorefining processes, it being understood that hydrorefining also includes some hydrogenation of aromatic and unsaturated aliphatic hydrocarbons. Thus, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogen-containing hydrocarbon oils. U.S. Pat. No. 2,715,603, discloses the use of molybdenum sulfide as a catalyst for the hydrogenation of heavy oils, while U.S. Pat. No. 3,074,783 discloses the use of molybdenum sulfides for producing sulfur-free hydrogen and carbon dioxide, wherein the molybdenum sulfide converts carbonyl sulfide to hydrogen sulfide. Molybdenum and tungsten sulfides have other uses as catalysts, including hydrogenation, methanation, water gas shift, etc. reactions.

In general, with molybdenum and other transition metal sulfide catalysts as well as with other types of catalysts, higher catalyst surface areas generally result in more active catalysts than similar catalysts with lower surface areas. Thus, those skilled in the art are constantly trying to achieve catalysts that have higher surface areas. More recently, it has been disclosed in U.S. Pat. Nos. 4,243,553, and 4,243,554 that molybdenum sulfide catalysts of relatively high surface area may be obtained by thermally decomposing selected thiomolybdate salts at temperatures ranging from 300–800° C. in the presence of essentially inert, oxygen-free atmospheres. Suitable atmospheres are disclosed as consisting of argon, a vacuum, nitrogen and hydrogen. In U.S. Pat. No. 4,243,554 an ammonium thiomolybdate salt is decomposed at a rate in excess of 15° C. per minute, whereas in U.S. Pat. No. 4,243,553, a substituted ammonium thiomolybdate salt is thermally decomposed at a very slow heating rate of from about 0.5° to 2° C./min. The processes disclosed in these patents are claimed to produce molybdenum disulfide catalysts having superior properties for water gas shift and methanation reactions and for catalyzed hydrogenation or hydrotreating reactions.

SUMMARY OF THE INVENTION

This invention relates to a process for the preparation of supported, iron-promoted molybdenum and tungsten sulfide catalysts, the catalyst species prepared by such process and to the use of such supported species for hydroprocessing processes, particularly hydrotreating. More particularly, this invention relates to the preparation and use of supported catalysts useful for hydroprocessing processes such as hydrotreating wherein said catalysts are formed by heating, at elevated temperature, in the presence of sulfur and under oxygen-free conditions, a composite of support material and one or more precursor salts containing a thiometallate anion of Mo, W or mixture thereof and a cation comprising divalent iron and, optionally, one or more promoter metals which are chelated by at least one neutral, nitrogen-containing polydentate ligand, wherein said additional promoter metal is selected from the group consisting of Ni, Co, Mn, Zn, Cu and mixture thereof. With the possible exception of Co which can be either divalent or trivalent, the chelated promoter metal in the cation will be in the divalent state. However, for all practical purposes, all of the promoter metals in the precursor salt or salts, including Co, will be in the divalent state.

These precursor salts are of the formula (ML) ($Mo_yW_{1-y}S_4$) wherein M comprises at least one divalent promoter metal selected from the group consisting of (a) iron and (b) mixtures of iron with Ni, Co, Mn, Zn, Cu and mixtures thereof, wherein y is any value ranging from 0 to 1, and wherein L is one or more, neutral, nitrogen-containing ligands at least one of which is a chelating polydentate ligand. If a catalyst of this invention contains a promoter metal in addition to Fe, it is preferred that said additional promoter metal M will be selected from the group consisting of Co, Ni and mixtures thereof. In a particularly preferred embodiment ligand L will have a denticity of six and will be either three bidentate or two tridentate chelating ligands.

Thus, it will be appreciated that in one embodiment the catalyst compositions of this invention will be a supported sulfide of a mixture of iron and a metal selected from the group consisting of Mo, W and mixture thereof. In another embodiment, the compositions of this invention will be a supported sulfide of a mixture of (a) a sulfide or iron and at least one metal selected from the group consisting of Mo, W and mixture thereof and (b) metal sulfide of metal selected from the group consisting of Ni, Co, Mn, Cu, Zn and mixture thereof, preferably Ni, Co and mixture thereof.

In a preferred embodiment ligan L will have a denticity of six and will be either three bidentate or two tridentate chelating ligands and the non-oxidizing atmosphere used to form the catalyst will be a mixture of hydrogen and hydrogen sulfide. It will also be appreciated that, because the catalyst composition of this invention must contain iron along with Mo, W or mixture thereof, the precursor salt or salts must contain these metals. Optionally, both the catalyst composition of this invention and the precursor salts may also contain one or more metals selected from the group consisting of Ni, Co, Mn, Zn, Cu and mixture thereof.

Hydroprocessing processes is meant to include any process that is carried out in the presence of hydrogen including, but not limited to, hydrocracking, hydrodenitrogenation, hydrodesulfurization, hydrogenation of aromatic and unsaturated hydrocarbons, methanation, water gas shift, etc. These reactions include hydrotreating and hydrorefining reactions, the difference generally being thought of as more of a difference in degree than in kind, with hydrotreating conditions being more severe than hydrorefining conditions. Some of the catalysts of this invention have been found to have hydrotreating or hydrorefining activity greater than that of catalysts derived from conventional hydrotreating catalyst precursors such as cobalt molybdate on alumina, even though their surface areas are not as high.

DETAILED DESCRIPTION OF THE INVENTION

The precise nature and composition of the catalyst species that is formed as a result of heating a composite of support material and one or more precursor salts in the presence of sulfur and under oxygen-free conditions is not known. However, the supported catalyst species of this invention are believed to be related to the bulk unsupported catalyst species defined in U.S. patent application Ser. No. 687,536 jointly filed by A. J. Jacobson, R. R. Chianelli and T. A. Pecoraro Dec. 28, 1984. Thus, the unsupported catalyst species of Jacobson et al. are formed by heating one or more of the precursor salts disclosed in this application in the presence of sulfur and under oxygen-free conditions.

The bulk, unsupported compositions of the corresponding invention to Jacobson et al are unique in that they comprise an amorphous sulfide or iron and at least one metal selected from the group consisting of Mo, W and mixture thereof. In one embodiment, the compositions of their invention comprise a mixture of (a) an amorphous sulfide of iron and a metal selected from the group consisting of Mo, W and mixture thereof and, (b) metal sulfide of at least one metal selected from the group consisting of Ni, Co, Mn, Zn, Cu and mixture thereof. Thus, the bulk, unsupported catalyst species of Jacobson et al. are formed by heating one or more precursor salts disclosed in this application at elevated temperature, in the presence of sulfur, preferably excess sulfur and under oxygen-free conditions.

The amorphous sulfide compositions of iron and Mo, W or mixture thereof of the Jacobson et al invention were determined to be amorphous using a number of analytical techniques briefly described below.

X-ray diffraction (XRD) analysis was done by grinding a sample to fine powder and packing it into an aluminum tray containing a cylindrical recess 25 mm in diameter and 1 mm in depth. The top surface of the sample was flat and co-planar with the top of the aluminum tray after this preparation. Measurements were made in ambient atmosphere using a Siemens D500 X-ray diffractometer in 0-20 reflection (Bragg-Brentano) geometry. The incident X-ray beam was taken from a fixed anode copper target with a wavelength of 1.54178 Å. The diffracted beams were monochromated using a graphite monochromator to minimize fluorescence and were detected using a proportional counter detector. Data were collected by stepping the detector in angular increments of 0.02-20 and counting at each step for two seconds. The intensity and angular information were stored in a PDP 1103 computer and subsequently plotted as detected counts in 2 seconds versus 20.

The morphology and crystal structure determination of the constituent phases were carried out using high resolution and analytical electron microscopy. In this procedure, described in P. C. Flynn et al., *J. Catal.*, 33, 233-248 (1974), the transition metal sulfide powder is prepared for the Transmission Electron Microscope (TEM) by crushing in an agate mortar and pestle to produce powder fragments through which an electron beam can pass. The crushed powder is ultrasonically dispersed in hexane and a drop of this suspension is allowed to dry onto a standard 3 mm TEM grid, which is covered with a thin ($\leqq 200$ Å) amorphous carbon film. Samples were analyzed in a Philips 400T FEG TEM at 100 KV by bright field imaging, energy dispersive X-ray microanalysis, and microdiffraction.

Quantitative chemical analysis was obtained by the thin foil ratio method, as described in G. Cliff and G. W. Lovimer; J. Microscopy, 1975, Volume 103, Page 203, and absorption effects were analyzed and corrected using the procedure described by Goldstein, et al. in "Introduction to Analytical Electron Microscopy", J. J. Hren, J. I. Goldstein, and D. C. Joy eds, Plenum Press, New York, N.Y. 1979, Page 83. X-ray fluorescent spectra were generated from the excited volume of a sample defined by a cylinder of 100 Å probe size and the thickness of the sample (typically 1000 Å).

An additional method used to evaluate the extent of dispersion and chemical state of the transition metal sulfide compositions of the Jacobson et al invention was EXAFS (Extended X-ray Absorption Fine Structure). EXAFS is an element-specific electron scattering technique in which a core electron ejected by an X-ray photon probes the local environment of the absorbing atom. The ejected photoelectron is backscattered by the neighboring atoms of the absorbing species and interferes constructively or destructively with the outgoing electron wave, depending on the energy of the photoelectron. The energy of the photoelectron is equal to the difference between the X-ray photon energy and a threshold energy associated with ejection of the electron. In the EXAFS experiment, the photoelectron energy is varied by varying the energy of the incident X-ray beam. The interference between outgoing and backscattered electron waves as a function of energy modulates the X-ray absorption coefficient so that the EXAFS function K.X(K) is observed experimentally as oscillations in the absorption coefficient on the high energy side of the absorption edges (c.f. Via et al., *J. Chem. Phys.*, 71, 690 (1979).

In one method of preparing the supported catalyst species of this invention, a slurry of precusor material is incorporated with a pre-selected quantity of refractory inorganic oxide support material, preferably a particulate mass of said support, with the resulting composite then dried and the dried, particulate, composite then heated in an oxygen-free atmosphere in the presence of sulfur or sulfur-bearing compound at elevated temperature to form the catalyst species of this invention. A sufficient amount of the precursor salt or salts is composited with the support so that prior to, or at the time that the composite of support and precursor material is heated in the presence of sulfur and under oxygen-free conditions, generally from about 5 weight percent to about 50 weight percent of the salt, expressed as weight of $MoO_3$ or $WO_3$ on an ignition loss free basis, will be present on the support. The supported catalyst species of this invention are highly active and selective as hydrotreating catalysts.

As previously stated, the supported catalysts of this invention may be prepared from a composite of inorganic refractory metal oxide support material and one or more precursor salts. The catalyst precursor salt or salts will have the formula (ML) ($Mo_yW_{1-y}S_4$) wherein M is one or more divalent promoter metals selected from the group consisting of (a) divalent Fe and (b) mixtures of divalent Fe with one or more divalent promoter metals selected from the group consisting of Ni, Co, Mn, Cu, Zn and mixtures thereof. Thus, the promoter metal may be only divalent Fe in which case the precursor would have the formula (FeL) ($Mo_yW_{1-y}S_4$). Alternatively the promoter metal may be a mixture of two or more promoter metals one of which is Fe. For the case of two promoter metals, such as Fe and Ni, the precursor would have the formula [($Fe_aNi_{1-a}$)L]-($Mo_yW_{1-y}S_4$) wherein $0<a<1$. In the case of three promoter metals such as Fe, Ni and Co, the precursor would have the formula of the form [($Fe_aNi_bCo_c$)L] ($Mo_yW_{1-y}S_4$) wherein $0<a$, b or $c<1$ and $a+b+c=1$. In any event, divalent Fe must be present in order to form a composition of this invention. The precursor may be a self promoted thiomolybdate, thiotungstate or combination thereof. If it is only a thiomolybdate it is obvious that y will have a value of 1. Alternatively, if the precursor is a thiotungstate y will be zero.

If desired, more molybdenum and/or tungsten sulfide may be incorporated into the catalyst composition than is permitted by the stoichiometric amount present in the (ML) ($Mo_yW_{1-y}S_4$) precursor salt, by mixing said precursor salt with one or more thiometallate salts of the general formula (L') ($Mo_yW_{1-y}S_4$). In the formula (L') ($Mo_yW_{1-y}S_4$), L' is the conjugate acid of one or more ligands, L, with a charge sufficient to balance the dinegative charge of the thiometallate anion. In its conjugate acid form the ligand forms a cation $[L']^{2+}$ which is ionically bound to the thiometallate anion. For example, if L is ethylenediamine (en), L' will be [$H_2$en] and the corresponding thiomolybdate salt, for example, will be [$H_2$en]($MoS_4$). For diethylene triamine, (dien), the corresponding salt will be [$H_2$ dien]($MoS_4$). These salts, (L') ($Mo_yW_{1-y}S_4$) may be prepared, for example, by dissolving ammonium thiometallate in excess of ligand or ligands L. The salt may then be recovered by addition of water or some other suitable antisolvent such as methanol or acetone.

The ligand L, will generally have a denticity of six and will be one or more neutral, nitrogen containing ligands wherein at least one of said ligands is a multidentate chelating ligand which chelates the promoter metal cation to form a chelated promoter metal cation $[ML]^{2+}$. Thus, the catalytic metal sulfide anion ($Mo_yW_{1-y}S_4)^{2-}$ will be ionically bound to the chelated promoter metal cation $[ML]^{2+}$. By neutral is meant that the ligand itself does not have a charge.

Those skilled in the art know that the term "ligand" is used to designate functional coordinating groups which have one or more pairs of electrons available for the formation of coordinate bonds. Ligands that can form more than one bond with a metal ion are called polydentate while ligands that can form only one bond with a metal ion are called monodentate. Monodentate ligands are not capable of forming chelates. Hence, of one uses one or more species of monodentate ligands in the precursor molecule, then one must also use at least one polydentate chelating ligand. Preferably L will be one or more polydentate chelating ligands. The denticity of the ligand L will generally be six, because the promoter metal cations prefer six-fold coordination. Hence, if more than one species of ligand is employed in the precursor molecule, the denticity of the ligand species will usually add up to six. It should be understood that it is possible for ligand L to have a total denticity of less than six, but in most cases L will have a total denticity of six. Thus, L will be three bidentate ligands, two tridentate ligands, a mixture of a bidentate and a quadridentate ligand, a hexadentate ligand or a mixture of a polydentate ligand with monodentate ligands as long as the combination has a total denticity of six. As has heretofore been stated, it is preferred to use chelating bidentate and tridentate ligands. In general, the ligands useful in this invention include alkyl and aryl amines and nitrogen heterocycles. Illustrative but non-limiting examples of ligands useful in the catalyst precursors of this invention are set forth below.

Monodentate ligands will include $NH_3$ as well as alkyl and aryl amines such as ethyl amine, dimethyl amine, pyridine, etc. Useful chelating bidentate amine ligands are illustrated by ethylenediamine, 2,2'-bipyridine, o-phenylene diamine, tetramethylethylenediamine and propane-1,3 diamine. Similarly, useful chelating tridentate amine liquids are represented by terpyridine and diethylenetriamne while triethylenetetramine is illustrative of a useful chelating guadridentate amine ligands. Useful chelating pentadentate ligands include tetraethylenepenamine while sepulchrate (an octazacryptate) is illustrative of a suitable chelating hexadentate ligand. However, as a practical matter it will be preferred to use chelating, polydentate alkyl amines for L. Illustrative, but non-limiting examples of alkyl amines that are useful in the catalyst precursor of this invention include ethylenediamine, diethylenetriamine, and tetraethylenetetramine. It is particularly preferred to use biodentate and tridentate alkyl amines such as ethylenediamine (en) and diethylenetriamine (dien).

Many of the precursor salts useful in forming the catalysts of this invention and methods for preparing them are known in the art, although it has not heretofore been known that such salts can be useful catalyst precursors. An article by Diemann and Mueller titled Thio and Seleno Compounds of the Transition Metals With d° Configuration published in COORD. CHEM. REV. 10:79–122 provides a review of known salts. In general, the precursor salts useful for forming the catalysts of this invention may be prepared by mixing an aqueous solution of ammonium thiomolybdate and/or thiotungstate with an aqueous solution of the chelated promoter metal cation $[ML]^{2+}$ which results in the formation of the precursor salt as a precipitate which is readily recovered. The chelating promoter cation is easily formed by, for example, mixing an aqueous solution of one or more water soluble promoter metal salts with the ligand or mixture of ligands. The water soluble salt may be any water soluble salt that is convenient to use such as a halide, sulfate, perchlorate, acetate, nitrate, etc. Alternatively, an aqueous solution of ammonium thiomolybdate and/or tungstate may be mixed with the ligand with the resulting solution mixed with an aqueous solution of promoter metal salt or the salt can be added to the ligand and dissolved into the solution of thiomolybdate and/or thiotungstate. The catalyst precursor preparation will be further understood by reference to the Examples, infra. However, it should be understood that the catalyst precursor preparation is not intended to be limited to aqueous media.

Any step of the precursor salt preparation may be done in the presence of a slurry of support material, in which case the precursor salt will be formed or precipitated onto the surface of the support material. Alternatively, the precursor salt or salts may be prepared and then composited with support material to form the catalyst precursor composite. The catalyst precursor preparation will be further understood by reference to the Examples, infra. However, it should be understood that the catalyst precursor preparation is not intended to be limited to aqueous media.

The catalysts of this invention may be prepared by heating a composite of support material and one or more catalyst precursor salts, in the presence of sulfur in an oxygen-free atmosphere or environment, at a temperature of at least about 150° C., preferably at least about 200° C. for a time sufficient to form the catalyst. The sulfur required during the formation of the catalyst may be that which is present in the precursor salt in which case the expression "in the presence of sulfur" means that sulfur is present in the precursor salt. Thus, it has been found that catalyst compositions of this invention will be formed if no excess sulfur is present and if the oxygen-free atmosphere is relatively inert, such as nitrogen. In some cases, however, it is preferred that the sulfur will be present in an amount in excess of that contained in the precursor salt. In those cases where it is preferred that the catalyst be formed by heating the precursor in the presence of excess sulfur, it is also preferred that the excess sulfur be present in the form of a sulfur bearing compound which can be one or more solids, liquids, gases or mixtures thereof. Mixtures of hydrogen and $H_2S$ have been found to be particularly suitable. Typically the temperature will range between from about 200–600° C., preferably from about 250–600° C., more preferably from about 250°–500° C. and still more preferably from about 300°–400° C. The non-oxidizing atmosphere may be gaseous, liquid or mixture thereof.

As discussed under Background of the Disclosure, molybdenum and tungsten sulfide catalysts have many uses, including hydrotreating. Hydrotreating conditions vary considerably depending on the nature of the hydrocarbon being hydrogenated, the nature of the impurities or contaminants to be reacted or removed, and, inter alia, the extent of conversion desired, if any. In general however, the following are typical conditions for hydrotreating a naphtha boiling within a range of from about 25° C. to about 210° C., a diesel fuel boiling within a range of from about 170° C. to 350° C., a heavy gas oil boiling within a range of from about 325° C. to about 475° C., a lube oil feed boiling within a range of from about 290 to 550° C. or a residuum containing from about 10 percent to about 50 precent of a material boiling above about 575° C.

| TYPICAL HYDROTREATING CONDITIONS | | | | |
|---|---|---|---|---|
| Feed | Temp., °C. | Pressure psig | Space Velocity V/V/Hr | Hydrogen Gas Rate SCF/B |
| Naphtha | 100–370 | 150–800 | 0.5–10 | 100–2000 |
| Diesel Fuel | 200–400 | 250–1500 | 0.5–6 | 500–6000 |
| Heavy Gas Oil | 260–430 | 250–2500 | 0.3–4 | 1000–6000 |
| Lube Oil | 200–450 | 100–3000 | 0.2–5 | 100–10,000 |
| Residuum | 340–450 | 1000–5000 | 0.1–2 | 2000–10,000 |

It should be noted that the compositions of this invention are useful for lube oil refinery processes wherein it is desirable to remove oxidation initiating nitrogen compounds from lube oil feeds.

The invention will be further understood by reference to the following examples.

EXAMPLES

Catalyst Precursor Preparation

Iron ethylenediamine thiomolybdate Fe(en)$_3$MoS$_4$ was prepared by dissolving 12 gm of (NH$_4$)$_2$MoS$_4$ into 25 ml of ethylenediamine (en) in a 250 ml Erlenmeyer flask. Distilled H$_2$O was used twice to wash off any solid or solution remaining on the sides of the flask. The resulting dark red solution was cooled to 0° C. in an ice bath and kept in the bath for the duration of the experiment. In a separate flask 18.4 gm of Fe(NH$_4$)$_2$(SO$_4$)$_2$.6H$_2$O were dissolved into 100 ml of distilled H$_2$O and at least 10 ml of ethylenediamine was added slowly to this Fe$^{2+}$ solution to form Fe(en)$_3^{2+}$. The resulting solution was dark blue. This Fe(en)$_3^{2+}$ solution was then allowed to cool at room temperature. The Fe(en)$_3^{2+}$ solution was added slowly, as aliquots, to the (NH$_4$)$_2$MoS$_4$/en solution with agitation for approximately 2 min. after each addition. An orange ppt. formed immediately. Distilled H$_2$O was added to increase the volume of the reaction mixture. The mixture was kept in the ice bath for at least 15 min. until the reaction was completed. The ppt. was separated out by vacuum filtration through a Buchner funnel. The product Fe(en)$_3$MoS$_4$, was further washed with ethanol and dried under vacuum for 16-24 hrs. 20.9 gm of Fe(en)$_3$MoS$_4$ were recovered.

When the precursors were made containing iron and additional divalent promoter metals such as Co, Ni and Zn, the chloride salts of these additional metals were used. Thus, appropriate amounts of the chloride salts of divalent Ni, Co and/or Zn were combined with the aqueous solution of Fe(NH$_4$)$_2$(SO$_4$)$_2$.6H$_2$O and en and the combined salt solution was slowly added to the (NH$_4$)$_2$MoS$_4$/en solution to form the precursor. In one case, (NH$_4$)$_2$WS$_4$/en was used as the anion.

In all cases the resulting catalyst precursor powder was screened, pelletized and sized to 20/40 mesh (Tyler).

Example 1

In this example a catalyst was prepared by heating the precursor, ferrous trisethylenediamine thiomolybdate Fe(en)$_3$MoS$_4$, in a mixture of H$_2$/H$_2$S (15% H$_2$S) at 375° C. for two hours. A catalyst formed by heating ammonium thimolybdate (NH$_4$)$_2$MoS$_4$ [prepared by the method described by S. J. Tauster et al. in J. of Cat. 63, 515 (1980)] in the H$_2$/H$_2$S mixture was used as a control. The resulting black solids were pressed into pellets under 15,000-20,000 psi and then meshed through 10/20 mesh or 20/40 mesh sieves. One gram of this meshed catalyst was mixed with 10 g of 1/16-in. spheroid porcelain beads and placed in the catalyst basket of a Carberry-type autoclave reactor. The remainder of the basket was filled with more beads. The reactor was designed to allow a constant flow of hydrogen through the feed and to permit liquid sampling during operation.

After the catalyst and beads were charged to the reactor, the reactor system was flushed with helium for about 30 minutes after which hydrogen flow through the reactor was initiated at a rate of 100 STD cc/min. After the hydrogen began flowing through the reactor, the reactor was charged with 100 cc of a feed comprising a DBT/decalin mixture which was prepared by dissolving 4.4 g of dibenzothiphene (DBT) in 100 cc of hot Decalin. The solution thus contained about 5 wt. % DBT or 0.8 wt. % S. The hot feed solution was filtered and 1 cc of decane was added.

After the feed was charged to the reactor, the hydrogen pressure was increased to about 450 psig and the temperature in the reactor raised from room temperature to about 350° C. over a period of about ½ hour. The hydrogen flow rate through the reactor was maintained at about 100 STD cc per minute. When the desired temperature and pressure were reached, a GC sample of liquid was taken and additional samples taken at one hour intervals thereafter. The liquid samples from the reactor were analyzed using a Gas Chromatograph.

As the reaction progressed, samples of liquid were withdrawn once an hour and analyzed by gas chromatography in order to determine the activity of the catalyst towards hydrodesulfurization as well as its selectivity for hydrogenation. The hydrodesulfurization activity was determined according to the following model reaction:

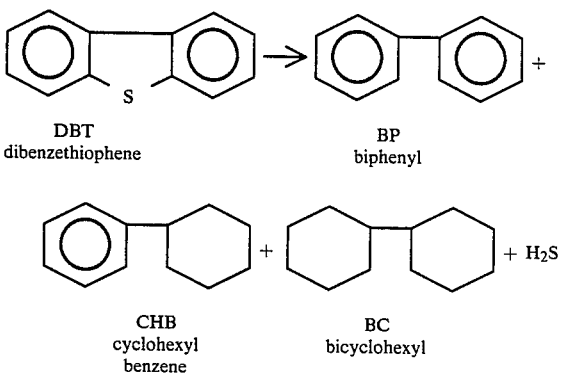

DBT
dibenzethiophene

BP
biphenyl

CHB
cyclohexyl benzene

BC
bicyclohexyl

The hydrodesulfurization activity or zero order rate constant, k, for the iron promoted catalyst was found to be $41 \times 10^{16}$ molecules of DBT desulfurized per gram of catalyst per second. This activity was determined at a DBT conversion level $\leq 50\%$. The results are summarized in Table I.

TABLE I

| | HDS Activity in DBT/Decalin at 350° C. | | |
|---|---|---|---|
| Example No. | Catalyst Precursor | HDS rate constant k, per gm. of catalyst per sec. $\times 10^{16}$ | BET Catalyst Surface area, m$^2$/gm |
| Control 1 | (NH$_4$)$_2$MoS$_4$ | 36 | 108 |
| 1 | Fe(en)$_3$MoS$_4$ | 41 | 5 |

Example 2

This experiment was similar to that of Example 1 and demonstrates the requirement of using a chelating nitrogen containing neutral ligand to complex the promoter metal cation to form the catalysts of this invention. In this experiment, the iron-molybdenum sulfide precursor salt was prepared by adding an aqueous solution of ferrous chloride to an aqueous solution of (NH$_4$)$_2$MoS$_4$. A precursor precipitate was formed and treated as in Examples 1. Comparing the results of this experiment which is set forth in Table 2 with that in Table 1 shows a significant difference in HDS activity between the catalysts of this invention and MoS$_4$ catalysts promoted by conventional means.

TABLE 2

Organic Amine is Necessary for High Activity

| Example | Precursor | HDS Rate Constant $k \times 10^{16}$ |
|---------|-----------|--------------------------------------|
| 2       | ppt Fe/MoS$_4$ | 9                               |

Examples 3-14

Catalyst Preparation

For these experiments the catalyst precursors were pelletized using a 4% aqueous solution of polyvinyl alcohol and were placed into a stainless steel reactor at 100° C. at atmospheric pressure where they were purged for one hour under nitrogen. Ten percent of hydrogen sulfide in hydrogen was introduced into the reactor at a space velocity of 0.75 SCF/hr for each 10 cc of catalyst in the reactor. The temperature in the reactor was then raised to 325° C. and kept at this temperature for three hours to form the catalyst after which the temperature in the reactor was lowered to 100° C., the H$_2$S/H$_2$ gas flow was stopped and the reactor was purged with nitrogen until room temperature was reached. Reaction Conditions The catalysts were loaded into a fixed-bed stainless steel reactor. The conditions in the reactor were as set forth below:

| | |
|---|---|
| Temperature | 325° C. |
| Pressure | 3.15 MPa |
| Hydrogen rate | 3000 SCF/bbl |
| LHSV | 1.5-6.0 V/V/Hr. |

The liquid product was analyzed for total sulfur by X-ray fluorescence and for nitrogen by combustion analysis. The feedstock used was a light catalytic cycle oil (LCCO) that was about 20 wt. % paraffinic having properties set forth in Table 3.

In all of these experiments, the results obtained from the catalysts of this invention were compared to results obtained from commercial hydrotreating catalysts comprising cobalt molybdate on —Al$_2$O$_3$ and nickel molybdate on —Al$_2$O$_3$, respectively. The cobalt molybdate catalyst contained 12.5 percent molybdenum oxide and 3.5 percent cobalt oxide supported on the gamma alumina and the nickel molybdate contained 18 percent molybdenum oxide and 3.5 percent nickel oxide on gamma alumina. These commercial catalysts were sulfided employing the same procedure used to form the catalysts of this invention, except that the temperature was 360° C. for one hour.

Experimental Runs

In these experiments, a number of runs were made using the self-promoted catalysts of this invention and the LCCO feed comparing them to the commercial catalyst. The activities of the various catalysts were determined by varying the space velocity (LHSV) in order to determine the HDS reaction rate constant ($K_{HDS}$). The results of these experiments showed that for some catalysts the HDS rate constant was second order while for others it was 1.5 order. The HDS rate constant $K_{HDS}$ was calculated using a least squares method passing through the origin on a plot of $$\left(\frac{S_f}{S_p}\right)^{n-1} - 1$$

as the ordinate and reciprocal of the space velocity as the abscissa, according to the following equation:

$$\left(\frac{S_f}{S_p}\right)^{n-1} - 1 = (n-1) K_{HDS} \frac{(S_f)^{n-1}}{LHSV}$$

wherein $S_f$ and $S_p$ are the wt. % of sulfur in the feed and product, respectively and wherein n is the order of the HDS reaction (n=2 for second order and 1.5 for 1.5th order).

Similarly, the HDN rate constant, $K_{HDN}$, which is a first order rate constant for all the catalysts, was also plotted using a least squares method passing through the origin on a semi-logarithmic plot of $N_f/N_p$ as the logarithmic ordinate and reciprocal of the space velocity as the abscissa, according to the following equation:

$$\frac{K_{HDN}}{LHSV} = \ln\left(\frac{N_f}{N_p}\right)$$

wherein $N_f$ and $N_p$ are the wt. % of nitrogen in the feed and product, respectively.

The results are set forth in Tables 4 and 5. The difference between Tables 4 and 5 is that in Table 4 the HDS rate constant, $K_{HDS}$, of all the catalysts listed therein is a 1.5 order rate constant and in Table 5, the HDS rate constant of all the catalyts is second order. It should be noted that a 1.5th order of kinetics was used for the correlation (correlation coefficient of 0.963) of the HDS data obtained from the commercial catalyst in Table 4 in order to obtain a convenient basis for comparison, even though a second order kinetics fit the data slightly better (correlation coefficient=0.975). This treatment does not effect in any way the relative activity ranking for the catalysts set forth in Table 4. All it does is to give a somewhat more conservative comparison between the commercial catalysts and the catalysts useful in the process of this invention.

TABLE 3

LCCO Feed

| | |
|---|---|
| Gravity (°API) | 18.6 |
| Sulfur, wt. % | 1.5 |
| Nitrogen, ppm | 370 |

GC distillation

| Wt. % | Temp., °C. |
|-------|------------|
| 5     | 231        |
| 10    | 251        |
| 50    | 293        |
| 70    | 321        |
| 90    | 352        |
| 95    | 364        |

TABLE 4

HDN and HDS Activities of Catalysts

| Example | | $K_{HDN}$ | $K_{HDS}$ | HDN Selectivity* |
|---------|---|-----------|-----------|------------------|
| | Commercial Catalyst | | | |
| 3 | Cobalt molybdate on j-Al$_2$O$_3$ | 0.6 | 6.8 | 11.22 |
| 4 | Nickel molybdate on j-Al$_2$O$_3$ | 1.3 | 6.24 | 27.82 |
| | Catalyst Precursor | | | |
| 5 | Fe$_{0.5}$Co$_{0.5}$(en)$_3$MoS$_4$ | 6.0 | 12.8 | 47.2 |
| 6 | Fe$_{0.5}$Ni$_{0.5}$(en)$_3$MoS$_4$ | 7.4 | 9.3 | 79.5 |
| 7 | Fe$_{0.7}$Co$_{0.3}$(en)$_3$MoS$_4$ | 4.1 | 10.3 | 40.2 |

TABLE 4-continued
HDN and HDS Activities of Catalysts

| Example | | $K_{HDN}$ | $K_{HDS}$ | HDN Selectivity* |
|---------|---|-----------|-----------|------------------|
| 8 | $Fe_{0.5}Co_{0.5}(en)_3WS_4$ | 6.1 | 9.2 | 66.4 |

*$\dfrac{K_{HDN}}{K_{HDS}} \times 10^2$

TABLE 5
HDN and HDS Activities of Catalysts

| Example | | $K_{HDN}$ | $K_{HDS}$ | HDN Selectivity* |
|---------|---|-----------|-----------|------------------|
| | Commercial Catalyst | | | |
| 3 | Cobalt molybdate on j-Al$_2$O$_3$ | 0.6 | 10.7 | 5.1 |
| 4 | Nickel molybdate on j-Al$_2$O$_3$ | 1.3 | 9.9 | 12.7 |
| | Catalyst Precursor | | | |
| 9 | $Fe(dien)_2MoS_4$ | 1.2 | 1.7 | 69.4 |
| 10 | $Fe(dien)_2WS_4$ | 3.3 | 4.6 | 75.7 |
| 11 | $Fe_{0.7}Ni_{0.3}(en)_3MoS_4$ | 2.8 | 6.2 | 47.1 |
| 12 | $Fe_{0.7}Ni_{0.1}Co_{0.1}Zn_{0.1}(en)_3MoS_4$ | 2.6 | 8.0 | 32.6 |
| 13 | $Fe_{0.8}Ni_{0.1}Co_{0.1}(en)_3MoS_4$ | 3.2 | 9.5 | 34.0 |
| 14 | $Fe_{0.5}Ni_{0.5}(en)_3WS_4$ | 3.1 | 7.3 | 42.7 |

*$\dfrac{K_{HDN}}{K_{HDS}} \times 10^2$

The catalyst prepared from the Fe(dien)$_2$MoS$_4$ precursor was analyzed using the EXAFS technique which revealed that, in addition to the known, conventional Mo-Mo interatomic distance of 3.19 Å, there were also Mo-Mo interatomic distances of 2.84 Å which are not found in *ordinary* MoS$_2$. HREM micrographs of this catalyst revealed a uniform, amorphous morphology. X-ray analysis of the catalysts 9 did not reveal the presence of crystalline molybdenum or iron sulfide. In addition, X-ray analysis of an Fe/Mn/Mo sulfide catalyst prepared from Fe$_{0.5}$Mn$_{0.5}$(en)$_3$MoS$_4$ did not reveal the presence of crystalline molybdenum or iron sulfide, but did show the presence of crystalline Mn sulfide.

Example 15

This experiment was similar to those of Examples 3 to 14 and employed the same procedure to prepare the iron diethylenetriamine (dien) catalyst precursor, to form the catalyst from the precursor and the same reactor, etc. However, in this experiment the catalyst of this invention was compared to a commercial cobalt molybdate HDS catalyst comprising 4.5 wt. % cobalt oxide and 16 wt. % molybdenum oxide on gamma alumina.

The feedstock used was an Arab light gas oil having the properties set forth in Table 6. The reaction conditions were as follows:

| Temperature | 340° C., 370° C. |
|---|---|
| Pressure | 7 MPa |
| Hydrogen rate | 4,000 SCF/BBL |
| LHSV | 1.0 |

TABLE 6
Arab Light Gas Oil

| Gravity API | 19.3 |
|---|---|
| Sulfur wt. % | 3 |
| Nitrogen ppm | 1,000 |
| GC Distillation wt.% | Temp., °C. |
| 5 | 437 |
| 10 | 456 |
| 50 | 505 |
| 70 | 537 |
| 90 | 565 |

The results of this experiment are set forth in Table 7.

TABLE 7

| Commercial Catalyst | Temp., °C. | % HDS | % HDN |
|---|---|---|---|
| | HDS Activity | | |
| Cobalt molybdate on γ-Al$_2$O$_3$ | 340 | 81 | 31 |
| | 370 | 97 | 56 |
| Catalyst Precursor | | | |
| Fe(dien)$_2$MoS$_4$ | 340 | 41 | 43 |
| | 370 | 87 | 89 |

EXAMPLE 16

Preparation and Evaluation of Conventional Iron-Molybdenum Catalyst Prepared Without Amine Ligand 40 g of FeCl$_3$ was ground to a fine powder, and 26.1 g of (NH$_4$)$_6$ Mo$_7$O$_{24}$.4H$_2$O (APM) added under continued mixing until the mixture was homogeneous. Sufficient water was added until the mixture had a paste-like consistency. The product was dried overnight in a vacuum oven at 100° C., followed by calcining at 500° C. for 4 hours. The dark brown powder was pilled to 20–40 mesh particles with the aid of an aqueous 4% polyvinyl alcohol binding solution.

The catalyst was sulfided with a 10/90 H$_2$S/H$_2$ mixture at 325° C. for 3 hours in the usual manner.

The catalyst evaluation was carried out in a fixed bed flow reactor at 3.15 MPa and 325° C., at an LHSV of 3.0 and a hydrogen treat rate of 2800–3000 SCF/B. As before, LCCO was used.

The catalyst had an average second order desulfurization rate constant, K$_{HDS}$ of only 0.35 over an 80 hour test run. Denitrogenation was essentially zero.

EXAMPLE 17

Preparation and Evaluation of Conventional Supported Iron-Molybdenum Catalyst Prepared Without Amine Ligand 32.7 g of Fe(NO$_3$)$_3$.9H$_2$O was dissolved in 75 ml of deionized water and the pH adjusted to O with about 2 ml HNO$_3$. This solution was used to impregnate 37.2 g of —Al$_2$O$_3$. The resultant paste was dried overnight at 100° C. and then calcined at 550° C. for 4 hours. The product was then treated with an aqueous solution of 8.76 g (NH$_3$)$_6$Mo$_7$O$_{24}$.4H$_2$O (APM) which had been adjusted to pH=14 with NH$_4$OH. The wet mass was again dried at 100° C. overnight, followed by a 4 hour calcination at 550° C. The golden brown product was crushed and screened to 20–40 mesh. Sulfiding was carried out at 325° C. for 3 hours with a 10/90 H$_2$S/H$_2$ stream in the usual manner.

19 cc of the sulfided catalyst was tested on LCCO, which had the properties previously described. Both desulfurization (HDS) and nitrogen removal (HDN) were measured at P=3.15 MPa, T=325° C., LHSV of 2.8–3.3, and hydrogen at about 3,000 SCF/Bbl. Over a run length of more than 100 hours, the average second order desulfurization rate constant K$_{HDS}$ was 1.42, and the average first order denitrogenation rate constant K$_{HDN}$ was 0.37, for a K$_{HDN}$/K$_{HDS}$ ratio of only 0.26.

EXAMPLE 18

Preparation of Al₂O₃-Supported Iron-Molybdenum Catalyst 140.8 g. of a 20% suspension of colloidal $Al_2O_3$ was diluted to 200 ml with water, and 27.1 g of $FeSO_4.(NH_4)_2SO_4.6H_2O$ dissolved in 75 ml of water were mixed with this suspension. 18.1 g of $(NH_4)_2MoS_4$ was dissolved in 100 ml $H_2O$ and 25 ml en, and this solution was added dropwise to the $Al_2O_3$ suspension with vigorous stirring. Stirring was continued for 1-2 hours after all the molybdenum solution had been added, followed by filtration, washing and drying at 50° C.

The dark brown material, precursor M, was screened to 20/40 mesh and charged to a reactor for sulfiding and evaluation as a hydrotreating catalyst.

EXAMPLE 19

Preparation of SiO₂—Supported Iron-Molybdenum Catalyst 19.2 g OF $FeSO_4.7H_2O$ was dissolved in 25 ml of water. When 20 ml of en was added to this solution, a milky white precipitate formed. Addition of 33 g of calcined silica resulted in a hard-to-stir mixture. 18.9 g of $(NH_4)_2MoS_4$ was then dissolved in 100 ml of deionized water and 50 ml of en. This solution was added dropwise to the silica suspension, vigorously stirring the mixture. The solid was recovered by filtration, washing and oven drying at 50° C. until constant weight.

After sulfiding this precursor, Precursor O, the resultant catalyst was evaluated for desulfurization and nitrogen removed.

EXAMPLE 20

Supported Catalyst Evaluation

The supported catalysts prepared in Examples 18 19 and 20 were evaluated for their desulfurization and denitrogenation activity. Experiments were carried out using a fixed bed flow reactor over a period of several days, feeding light catalytical cycle oil of 1.3–1.4 wt. % sulfur content and 300–400 ppm nitrogen. The results are listed in the table below, all obtained at a pressure of 3.15 MPa and a temperature of about 325° C.

HDS AND HDN ACTIVITY OF SUPPORTED IRON-MOLYBDENUM CATALYST

| Precursor | Sup-Support | LHSV | SCFH/B | Second Order $K_{HDS}$ | First Order $K_{HDN}$ | $K_{HDN}/K_{HDS}$ |
|---|---|---|---|---|---|---|
| M | Al₂O₃ | 3.2 | 2800 | 2.34 | 1.92 | 0.82 |
| O | SiO₂ | 3.1 | 2850 | 1.29 | 0.76 | 0.59 |

We claim:

1. As a composition of matter, a supported catalyst obtained by compositing a pre-selected quantity of support material with one or more precursor salts and heating said composite at elevated temperature of at least about 150° C., in the presence of sulfur and under oxygen-free conditions for a time sufficient to form said catalyst, wherein said precursor salt contains a tetrathiometallate anion of Mo, W or mixture thereof and a cation of divalent iron which is chelated by at least one neutral, nitrogen-containing polydentate ligand.

2. The catalyst of either of claim 1 wherein said ligand is selected from the group consisting of alkyl amines, aryl amines, nitrogen heterocycles and mixtures thereof.

3. The catalyst of claim 2 wherein said support material comprises one or more refractory inorganic oxides.

4. The catalyst of claim 3 wherein said ligand comprises an alkyl amine.

5. The catalyst of claim 4 formed in the presence of excess sulfur.

6. The catalyst of claim 5 wherein said oxygen-free conditions comprise a mixture of $H_2$ and $H_2S$.

7. A process for preparing a supported catalyst, said process comprising compositing a pre-selected quantity of support material with one or more precursor salts and heating said composite at elevated temperature of at least about 150° C., in the presence of sulfur and under oxygen-free conditions for a time sufficient to form said catalyst, wherein said precursor salt contains a tetrathiometallate anion of Mo, W or mixture thereof and a cation comprising divalent iron as a promoter metal and wherein said divalent promoter metal is chelated by at least one neutral, nitrogen-containing polydentate ligand.

8. The process of either of claim 7 wherein said ligand is selected from the group consisting of alkyl amines, aryl amines, nitrogen heterocycles and mixtures thereof.

9. The process of claim 8 wherein said support material comprises one or more refractory inorganic oxides.

10. The process of claim 9 wherein said ligand comprises an alkyl amine.

11. The process of claim 10 wherein said catalyst is formed in the presence of excess sulfur.

12. The process of claim 11 wherein said oxygen-free conditions comprise a mixture of $H_2$ and $H_2S$.

13. As a composition of matter, a supported catalyst obtained by compositing a pre-selected quantity of inorganic refractory oxide support material with one or more precursor salts and heating said composite at elevated temperature of at least about 150° C., in the presence of sulfur and under oxygen-free conditions for a time sufficient to form said catalyst, wherein said precursor salt is of the formula $(ML)(Mo_yW_{1-y}S_4)$ wherein M is divalent iron, wherein y is any value ranging from 0 to 1, and wherein L is one or more neutral, nitrogen-containing ligands, at least one of which is a chelating polydentate ligand.

14. The catalyst of claim 13 wherein said precursor salt is formed in the presence of a slurry of particles of support material.

15. The catalyst of either of claims 13 or 14 wherein ligand L is selected from the group consisting of alkyl amines, aryl amines, nitrogen heterocycles and mixtures thereof.

16. A process for preparing a supported catalyst, said process comprising compositing a pre-selected quantity of inorganic refractory oxide support material with one or more precursor salts and heating said composite at elevated temperature of at least about 150° C., in the presence of sulfur and under oxygen-free conditions for a time sufficient to form said catalyst, wherein said precursor salt is of the formula $(ML)(Mo_yW_{1-y}S_4)$ wherein M is divalent iron, wherein y is any value ranging from 0 to 1 and wherein L is one or more neutral, nitrogen-containing ligands, at least one of which is a chelating polydentate ligand.

17. The process of claim 16 wherein said precursor salt is formed in the presence of a slurry of particles of support material.

18. The process of either of claim 16 or 17 wherein ligand L is selected from the group consisting of alkyl amines, aryl amines, nitrogen heterocycles and mixtures thereof.

* * * * *